Feb. 26, 1935. J. R. PRICE 1,992,633
SODA FOUNTAIN CARBONATING PLANT AND THE LIKE AND METHOD THEREOF
Filed Jan. 21, 1932 2 Sheets-Sheet 1

INVENTOR
J. Roy Price,
BY
ATTORNEYS

Feb. 26, 1935. J. R. PRICE 1,992,633
SODA FOUNTAIN CARBONATING PLANT AND THE LIKE AND METHOD THEREOF
Filed Jan. 21, 1932 2 Sheets-Sheet 2
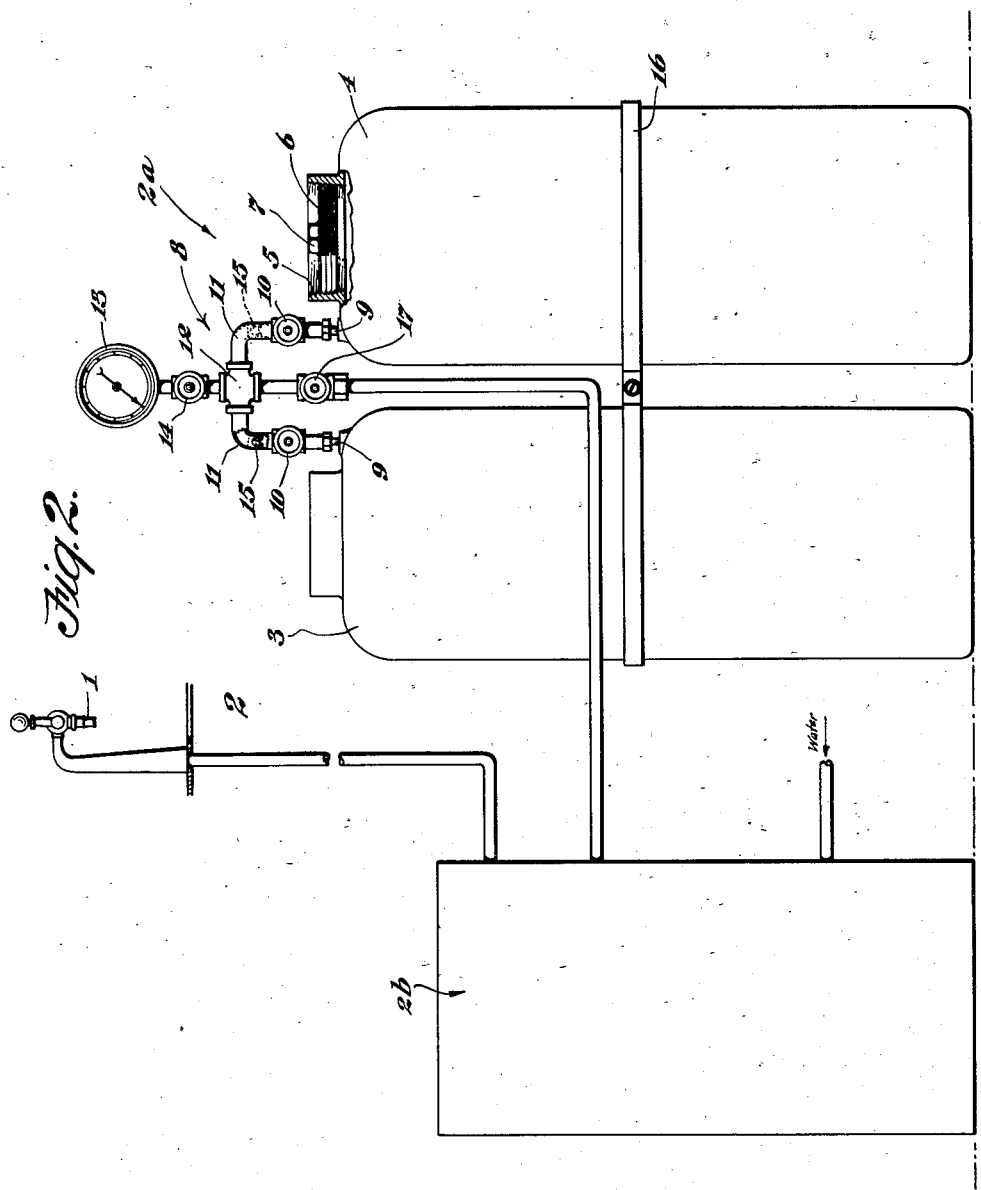
INVENTOR
J. Roy Price,
BY
ATTORNEYS Patented Feb. 26, 1935

1,992,633

UNITED STATES PATENT OFFICE 1,992,633

SODA FOUNTAIN CARBONATING PLANT AND THE LIKE AND METHOD THEREOF

Joseph Roy Price, Shreveport, La.

Application January 21, 1932, Serial No. 587,922

3 Claims. (Cl. 220—24)

This invention relates to soda fountain carbonating plants and the like and method thereof.

The conventional soda fountain plant includes a transportable drum containing the carbon dioxide gas under pressure, the gas drum or tank being filled at the factory or at a central gas manufacturing plant and being transported back and forth between the soda fountain and the plant usually at long distances and always at considerable expense and inconvenience to the soda fountain proprietor.

One object of the invention is a novel soda fountain gas plant which forms a permanent and fixed part of the equipment and is specially constructed and arranged to produce the carbon dioxide gas on the spot from material which is easily, economically and safely transportable and replenishable. This apparatus in its preferred form includes a converting tank or container which is provided with novel means for readily introducing the solid carbon dioxide and for closing the container against the high pressures to which it may be subjected. By using a plant of this character and by introducing the solid carbon dioxide into the same and thereby generating the gas right at the soda fountain a very substantial reduction in the expense of operation is effected, in addition to obviating the inconvenience and more or less unsatisfactory operation of the prior soda plants and systems wherein the tanks are required to be shipped two ways each time for replenishing, often at long distances with the considerable inconvenience of disconnecting and putting the tanks in position. According to my method and practice it is only necessary to transport the solid $CO_2$ and introduce it into the equipment at the soda fountain, the forming and generating of the gas then taking place gradually and automatically without any attention on the part of the attendant. The use of solid $CO_2$ for soda fountain purposes has been heretofore proposed, but I am not aware of any prior apparatus possessing the simplicity in construction and the convenience and reliability in operation of my plant.

For a better understanding of the invention reference may be had to the accompanying drawings forming a part of this application wherein:

Fig. 2 is a diagrammatic view representing another embodiment.

Figure 1:
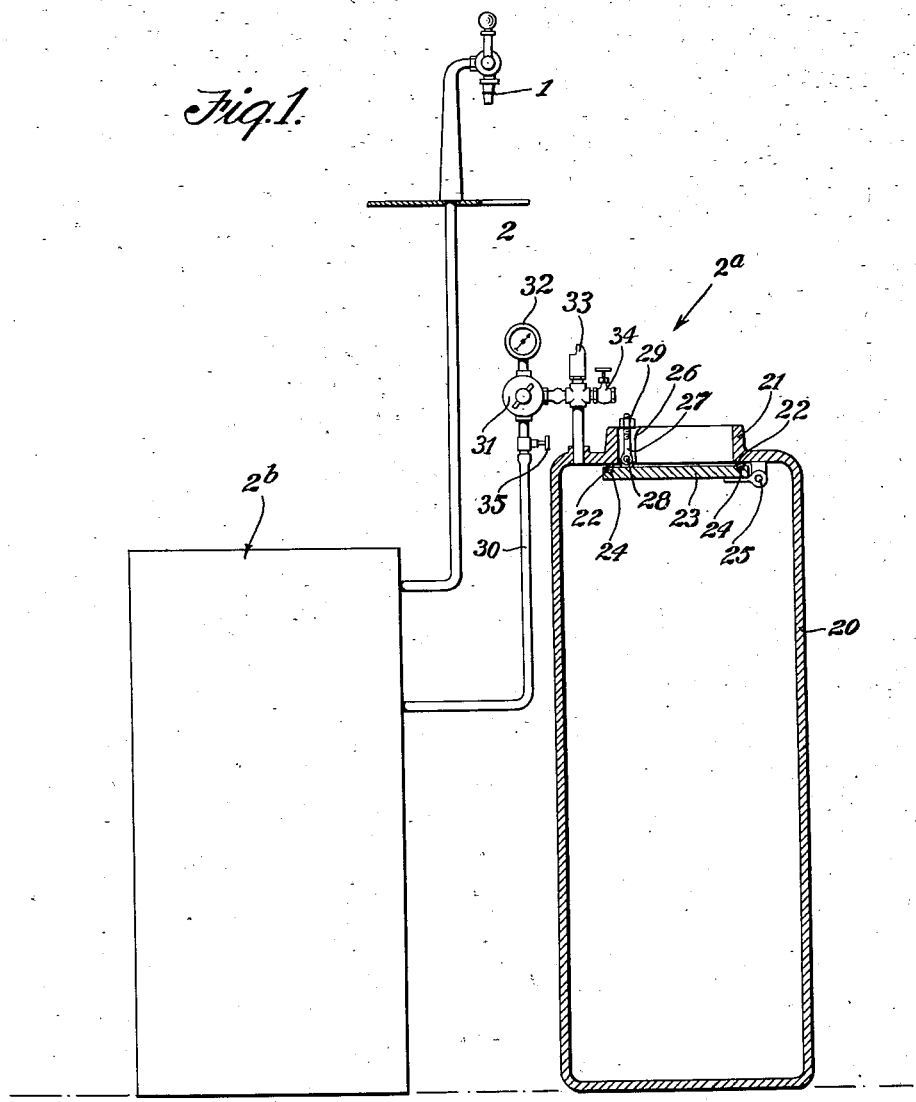
Fig. 1 is a diagrammatic view exhibiting one embodiment of the invention.

Referring to the drawings I have diagrammatically indicated at 1 a means for dispensing soda water drinks and the like which is operatively connected with my novel carbonic gas storing and producing and carbonating plant. This plant includes a water carbonating device or apparatus 2b and a gas producing and supplying means 2a. The latter in the preferred form of Fig. 1 comprises a single tank 20. The top or open end of the tank is formed with a tapered collar 21 forming an intake for the tank which facilitates the introduction of the solid $CO_2$. The inside of the tank just below the collar is provided with a bearing and sealing surface 22 against which a lid 23 is hinged, this lid or cover 23 being made of steel or other suitable metal of the same or substantially the same tensile strength as the tank or drum 20. The outer rim of the lid is provided with a groove 24 in which is fitted a gasket for preventing leakage and facilitating the tight seal of the lid. This gasket may be of any suitable material for the purpose. The lid is hinged at 25 to the interior of the drum 20 on one side and on the interior of the collar 21 there is a projection or lug 26 which is provided with a hole or slot in the upward direction to accommodate the insertion of a bolt 27 having one end pivotally attached at 28 to the upper side of the lid or cover 23. The bolt 27 is provided with a locking device 29 either in the form of a nut or other suitable device for causing the lid or cover 23 to firmly grip the interior of the drum casing. The bearing surface 22 underneath the collar where the gasket fits the inside surface is machined and dressed to provide a closely, securely and tightly fitting closure or seal against the escape of the gas. The surface connections and equipment between the container 20 and the carbonating apparatus comprises the pipe 30, a control valve 31 a pressure gauge 32 and a pop-off safety valve may be disposed at 33 or any other suitable point. The service connections, as indicated, are shown at the top of the tank which is the preferred arrangement. At 34 I have indicated a hand control valve for equalizing the pressure within the tank and the atmosphere if and when it should be desired to introduce solid $CO_2$ before the pressure is entirely exhausted within the tank.

Tank 20 may be a permanently fixed part of the soda fountain equipment and as is noted the solid $CO_2$ may be transported and placed therein. This solid $CO_2$ gradually sublimes off into a gas which is available at any time for use in the fountain. The particular equipment and tank shown has the advantage of extreme simplicity in construction and convenience and reliability in operation. There is a minimum of parts and the whole can be very cheaply manufactured. There are no threads to be made or close fitting machine work necessary, the only machining and dressing desired is on the under surface beneath the collar 21. Preferably the intake through the collar or neck 21 is circular, but other shapes, as for example square, rectangular, triangular etc., may be used if desired with corresponding shapes of cover or lid 23.

In the modification of Fig. 2 there is a pair of tanks or drums 3 and 4 of suitable dimensions to contain the required quantity of solid $CO_2$ necessary for producing the required quantity and pressure of gas for the soda fountain for a predetermined length of time. These containers are to be swedged or otherwise formed from steel of sufficient strength to safely withstand 1500 or more pounds pressure per square inch. The top or open end of a tank is formed into a tapered internally threaded collar 5 to receive a closing plug 6 which is machined and adapted to prevent leakage. The plug may be formed of a brass casting free from all blow holes and, as indicated, is machined and threaded with tapered thread to closely, securely and tightly fit into the collar to form a seal against escape of gas. This plug may be provided with any means for accommodating a tool for unscrewing and screwing the same home, as for example a square boss 7 formed integrally with the plug and being flush with the upper peripheral edge of the collar when the plug is secured home in its operative position. This plug must be of sufficient cross-sectional area to accommodate the necessary threads to render the collar and plug of a tensile strength at least equal to that of the material forming the main body of the generator or container. In the particular embodiment shown, I have indicated the collar as formed integrally with the main body of the generator or container, but it may be formed separately and welded to the main body. If made separately it must have a tensile strength at least equal to the tensile strength of the main body of the container and when the plug is screwed in place for properly closing the generator or container it must be capable of safely withstanding the full pressure of 1500 or more pounds. At 8 I have indicated generally the service connection and equipment between the containers and the carbonating apparatus. This equipment includes the following:

Each container is provided with a gas outlet into which is welded a nipple 9 which terminates in a valve 10 of the same size. The other side of this valve 10 is fitted with an elbow 11 terminating into a T fitting 12. The T fitting 12 is tapped to receive a pressure gauge 13 and preferably between the pressure gauge 13 and the elbow 11 is disposed a valve 14. A check valve 15, as for example of the ball type, is disposed in each elbow connection 11 between the T fitting 12 and the valve 10 to prevent the blowing by and escape of the gas upon removal or insertion of a container, although, of course, the valve 10 might be of a construction to prevent this escape. In any event, the check valve is preferred in addition to the valve 10. The complete assembly of the equipment 8 above the valve 10 must be constructed and arranged to provide for easy removal thereof, as for example by being provided with ground joint unions, etc. At 17 I have indicated a valve in the pipe leading to the carbonating device.

The solid $CO_2$ is introduced into the generator in the desired quantity and the plug 6 is screwed all the way down to assure proper closure and to render the same safe against rupture under the high pressure. Upon the introduction of the solid or frozen $CO_2$ and the closure of the container or converter it begins immediately to sublime off into gaseous $CO_2$ fumes and within a comparatively short time the pressure is sufficiently high for ordinary soda fountain work. If the pressure is permitted to accumulate with little gas utilized it will continue to rise to 1000 pounds and above, the gas (1000 pounds) then changing into a liquid at a temperature of about 80° F. I have found that the gaseous fumes given off by the solid $CO_2$ is very effective for soda fountain work and my method ordinarily contemplates the utilization of these fumes which are sublimed off directly from the solid blocks of $CO_2$, though, of course, if liquefaction takes place the carbonic gas therefrom continues the carbonating operation. When one of the containers is depleted the other one, of course, is readily connected with the soda fountain by means of the valve control indicated, the same having been replenished if necessary by solid $CO_2$ while the other container is supplying its gaseous fumes directly from the solid $CO_2$ to the soda fountain apparatus. If desired, means may be provided for equalizing the pressure within a depleted tank and the atmosphere to facilitate the removal of the plug for replenishing the container. This means may include a connection in the valve 10 or it may include another and independent outlet or intake with a valve therein for this purpose.

It is understood, of course, that I am not limited to any particular proportions and dimensions of apparatus, but I have found that a convenient size of tank for average soda fountain operation is 24" high and 9½" in diameter, the height being measured from the bottom of the plug in the closed position. For convenience the mouth of the collar should not be less than 6½" in diameter and the whole tank and equipment must be made to safely withstand, with the desired factor of safety, the maximum pressures to which it may be subjected, the full maximum pressure ordinarily being about 1500 pounds.

While I have described my invention as particularly applicable to soda fountain operation, it is understood that certain features thereof are of general application, as for example to bottling works, cooling systems and the like where $CO_2$ carbon gas is used and particularly where the gaseous fumes are useful when passed directly from the solid state to the gaseous state without going through the intermediate stage of liquefaction. The pressure gauge 13 could, of course, be positioned at any other point desired. This gauge or another gauge could be placed, for example, directly between the T fitting 12 and the valve 17 or directly on the pipe below the valve 17 and function as a set gauge.

I claim:

1. A carbonating plant for soda fountains and the like comprising a solid $CO_2$ container having an intake for introducing solid $CO_2$, a closure for said intake including a lid hinged to the under surface of the rim surrounding the intake, said lid having a groove around its upper periphery with a sealing gasket disposed in said groove, means for clamping said lid tightly against the under surface of the intake rim independently of the gaseous pressure comprising a lug formed on the tank and a bolt fastened to the cover or lid and valve means for equalizing the pressure within the tank with atmospheric pressure.

2. A device of the character set forth in claim 1 wherein the container comprises a tapered collar surrounding the intake and the clamping lug is formed on this collar.

3. A tank for soda fountain equipment and the like comprising a container adapted to contain and of a tensile strength adapted to withstand high $CO_2$ pressure resulting from the gasification of the solid $CO_2$, said tank comprising a tapered collar intake at the top, a cover or lid engaging the inner surface of the tank underneath the collar, said lid being provided with means for forming an air-tight seal therebetween and the container and means for clamping said lid tightly against the interior of the container comprising a lug formed on the interior of the collar and a clamping bolt fastened at one end to the lid and engaging said lug clamped together with means for equalizing the pressures within and exteriorly of the tank for the purpose set forth.

JOSEPH ROY PRICE.